United States Patent
Shibuya et al.

(10) Patent No.: US 8,341,843 B2
(45) Date of Patent: Jan. 1, 2013

(54) METHOD FOR MANUFACTURING WHEEL SUPPORTING ROLLING BEARING UNIT AND METHOD FOR INSPECTING DOUBLE ROW ROLLING BEARING UNIT

(75) Inventors: Eishi Shibuya, Fujisawa (JP); Tatsuo Wakabayashi, Fujisawa (JP); Shigemi Tsukamoto, Fujisawa (JP)

(73) Assignee: NSK Ltd., Tokyo (JP)

( * ) Notice: Subject to any disclaimer, the term of this patent is extended or adjusted under 35 U.S.C. 154(b) by 965 days.

(21) Appl. No.: 12/441,093

(22) PCT Filed: Sep. 14, 2007

(86) PCT No.: PCT/JP2007/067973
§ 371 (c)(1),
(2), (4) Date: Mar. 12, 2009

(87) PCT Pub. No.: WO2008/032831
PCT Pub. Date: Mar. 20, 2008

(65) Prior Publication Data
US 2010/0046870 A1    Feb. 25, 2010

(30) Foreign Application Priority Data

Sep. 14, 2006  (JP) .................................. 2006-248879
Oct. 2, 2006  (JP) .................................. 2006-271010

(51) Int. Cl.
*B23P 15/00*    (2006.01)
(52) U.S. Cl. ................ 29/898; 29/898.061; 29/898.062; 29/898.04
(58) Field of Classification Search ............... 29/898, 29/898.061, 898.062, 898.064, 898.07, 898.09
See application file for complete search history.

(56) References Cited

U.S. PATENT DOCUMENTS 5,718,049 A * 2/1998 Ohtsuki et al. ............. 29/898.09

(Continued)

FOREIGN PATENT DOCUMENTS

JP    2003-232343 A    8/2003

(Continued)

OTHER PUBLICATIONS

Junzo Okamoto. "Rolling Bearing, Dynamic Load Capacity of Rolling bearing": Seibun-sha Ltd., Sep. 1987, pp. 62-65.

*Primary Examiner* — David Bryant
*Assistant Examiner* — Christopher Besler
(74) *Attorney, Agent, or Firm* — Sughrue Mion, PLLC (57) ABSTRACT

In a wheel supporting rolling bearing unit in which pitch circle diameters of balls $6a$, $6b$ in an outside row and an inside row are made different, contact angles $\alpha_{OUT}$, $\alpha_{IN}$ of the balls $6a$, $6b$ in the two rows in a completed state are equal to each other. Initial contact angles $\beta_{OUT}$, $\beta_{IN}$ of the two rows are smaller than predetermined contact angles $\alpha_{OUT}$, $\alpha_{IN}$. The extent $[\alpha_{IN}-\beta_{IN}]$ to which the initial contact angle $\beta_{IN}$ of the balls $6b$, $6b$ in the inside row is made smaller than the predetermined contact angle $\alpha_{IN}$ of the balls $6b$, $6b$ is made larger than the extent $[\alpha_{OUT}-\beta_{OUT}]$ to which the initial contact angle $\beta_{OUT}$ of the balls $6a$, $6a$ in the outside row is made smaller than the predetermined contact angle $\alpha_{OUT}$ of the balls $6a$, $6a$ $\{[\alpha_{IN}-\beta_{IN}]>[\alpha_{OUT}-\beta_{OUT}]\}$. By this configuration, imparting the predetermined contact angles $\alpha_{OUT}$, $\alpha_{IN}$ to the balls $6a$, $6b$ in the two rows in the completed state, and the preloads and contact angles of the balls $6a$, $6b$ in the two rows are made proper.

4 Claims, 6 Drawing Sheets

U.S. PATENT DOCUMENTS

2005/0111771 A1 * 5/2005 Shevket .................. 384/544

FOREIGN PATENT DOCUMENTS

| | | | |
|---|---|---|---|
| JP | 2003-294033 | A | 10/2003 |
| JP | 2004-108449 | A | 4/2004 |
| JP | 2004-142722 | A | 5/2004 |
| JP | 2004-345439 | A | 12/2004 |
| JP | 2004-361390 | A | 12/2004 |
| JP | 2005-233406 | A | 9/2005 |
| JP | 2006-137365 | A | 6/2006 |
| WO | 2005/065007 | A2 | 7/2005 |

* cited by examiner

METHOD FOR MANUFACTURING WHEEL SUPPORTING ROLLING BEARING UNIT AND METHOD FOR INSPECTING DOUBLE ROW ROLLING BEARING UNIT

TECHNICAL FIELD

The present invention relates to a method for manufacturing a wheel supporting rolling bearing unit for supporting rotatably a wheel and a brake rotary member such as a brake rotor on a suspension system of a motor vehicle and a double row rolling bearing inspecting method for determining the existence of a defect produced in manufacturing steps of a double row rolling bearing unit such as the wheel supporting rolling bearing unit.

BACKGROUND ART

A wheel and a brake rotary member of a motor vehicle are supported rotatably on a suspension system by a wheel supporting rolling bearing unit. Since a large moment is exerted on a wheel supporting rolling bearing unit like this when the motor vehicle turns, rigidity against such a large moment or moment rigidity needs to be ensured in order to ensure the running stability. For this purpose, conventionally, as the wheel supporting rolling bearing unit, a construction has generally been used in which rolling elements are arranged in double rows and preload and a back-to-back type contact angle are imparted to the rolling elements in each of the two rows. For supporting wheels on suspension systems of motor vehicles, wheel supporting rolling bearing units of various types of constructions are known as are described in, for example, Patent Documents Nos. 1 to 6.

Figure 3:
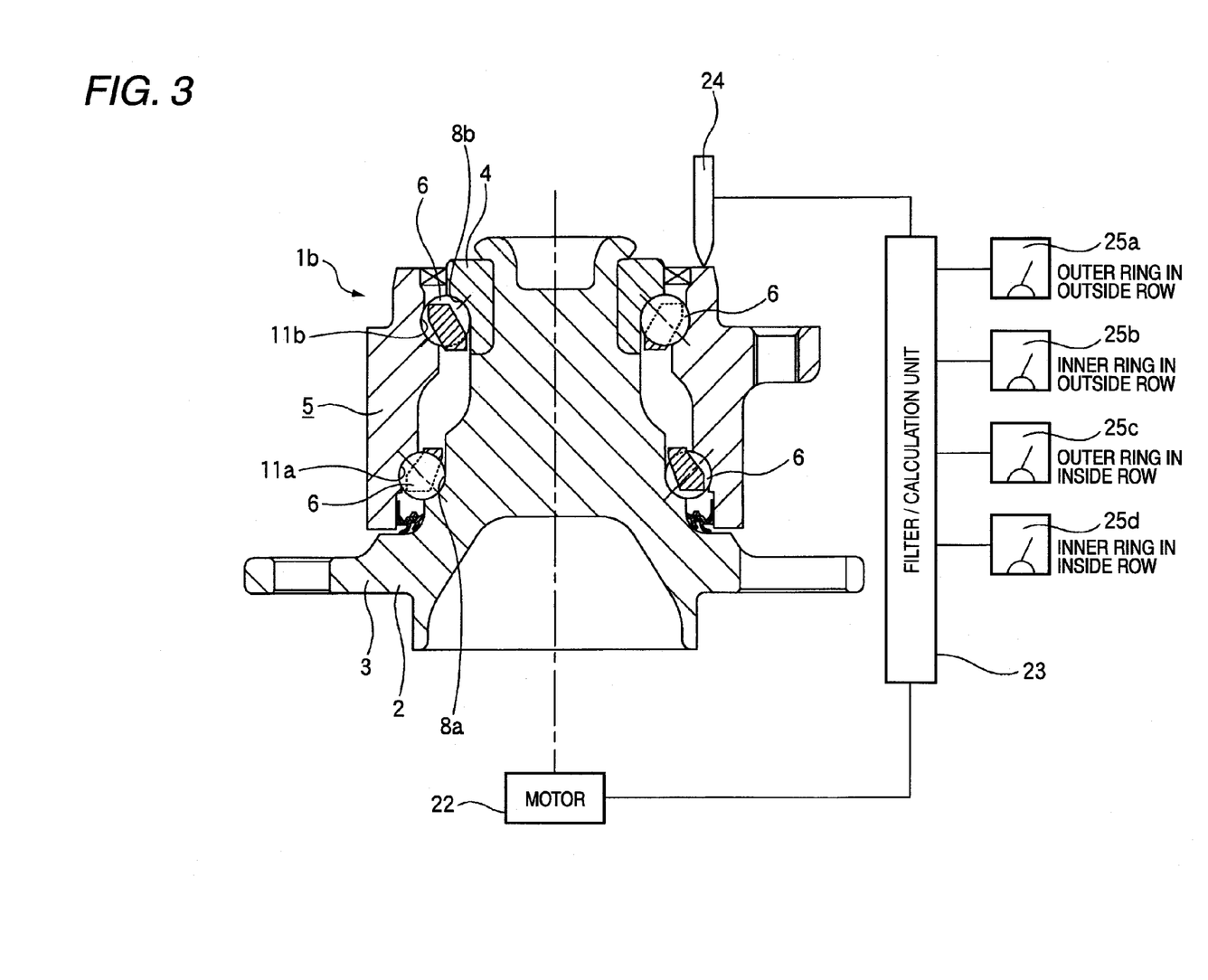
[FIG. 3] An exemplary view showing a second embodiment of the invention, which illustrates a state where it is carried out.
Figure 4:
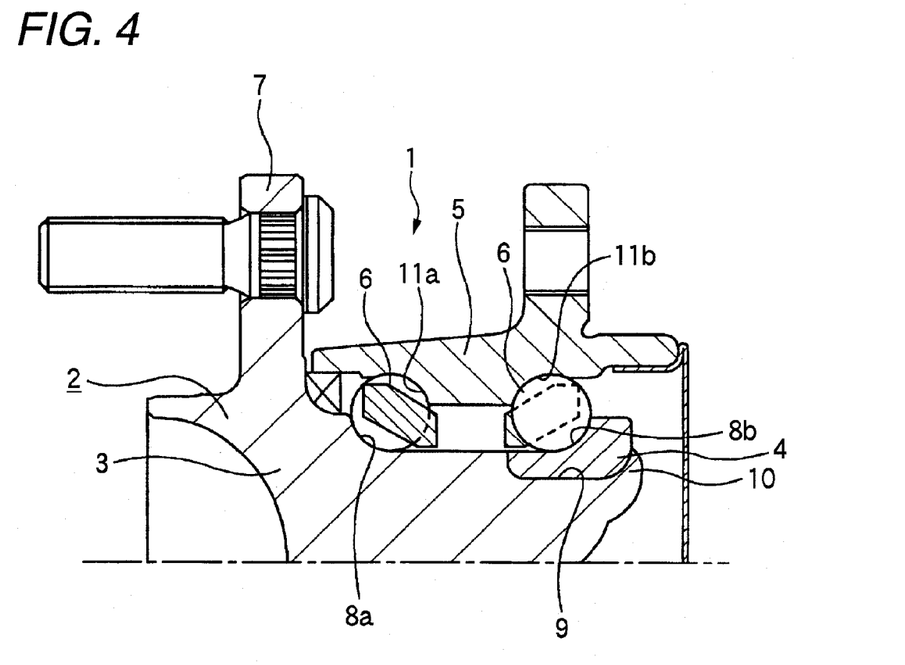
[FIG. 4] A sectional view showing a first example of a conventionally known construction for a wheel supporting rolling bearing unit which constitutes an inspection object of an inspection device of the invention.
Figure 5:
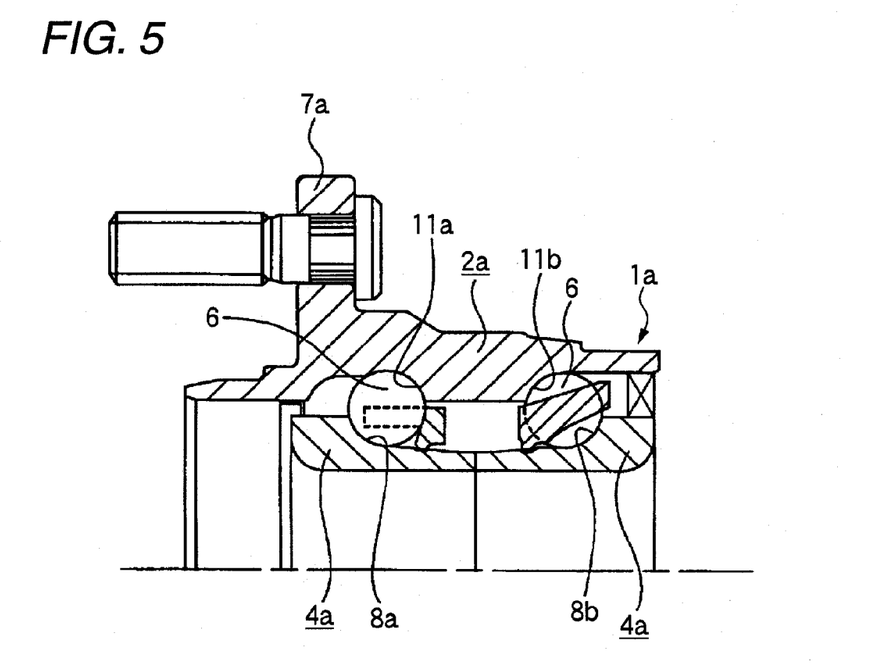
[FIG. 5] A half sectional view showing a second embodiment of the same.

FIGS. 4 to 5 show a construction described in Patent Document No. 1 of those patent documents. A wheel supporting rolling bearing unit 1 of a first example shown in FIG. 4 of these figures includes a hub main body 3 and an inner ring 4 which make up a hub 2 which is an inside diameter side raceway ring member, an outer ring 5 which is an outside diameter side raceway ring member and a plurality of rolling elements 6, 6. A flange 7 which supports a wheel is formed at an outer end portion of an outer circumferential surface of the hub main body 3 of those constituent components. (Outer with respect to an axial direction means a side which lies transversely outwards when the bearing unit is assembled on a motor vehicle, which is a lower side in FIG. 3 and a left-hand side in FIGS. 4 to 7. On the contrary, a side which lies transversely centrally means inner with respect to the axial direction, which is an upper side in FIG. 3 and a right-hand side in FIGS. 4 to 7. This is true throughout the description.)

An inner ring raceway 8a for an outside row is formed on the outer circumferential surface at an intermediate portion and a small-diameter stepped portion 9 whose outside diameter is decreased are formed at an inner end portion of the hub main body 3. Then, the inner ring 4 having an inner ring raceway 8b for an inside row formed on an outer circumferential surface thereof is fitted on this small-diameter stepped portion 9 so as to make up the hub 2 above. An inner end face of this inner ring 4 is pressed by a clamping portion 10 which is formed by clamping to expand diametrically outwards a cylindrical portion formed at the inner end portion of the hub main body 3, so as to fix the inner ring 4 to a predetermined position on the hub main body 3. Double rows of outer ring raceways 11a, 11b are formed on an inner circumferential surface of the outer ring 5, and the respective rolling elements 6, 6 are disposed between the two outer ring raceways 11a, 11b and the two inner ring raceways 8a, 8b so that pluralities of rolling elements 6, 6 are provided in the two rows, respectively.

Next, in a wheel supporting rolling bearing unit 1a of a second example shown in FIG. 5, a hub 2a, which is an outside diameter side raceway ring member and has a flange 7a for support a wheel, is disposed around a pair of inner rings 4a, 4a, which is an inside diameter side raceway ring members and do not rotate when fitted outwardly to a support shaft (not shown). Then, pluralities of rolling elements 6, 6 are provided, respectively, between outer ring raceways 11a, 11b formed on an inner surface of the hub 2a and respective inner ring raceways 8a, 8b formed on outer circumferences of the respective inner rings 4a, 4a.

Figure 6:
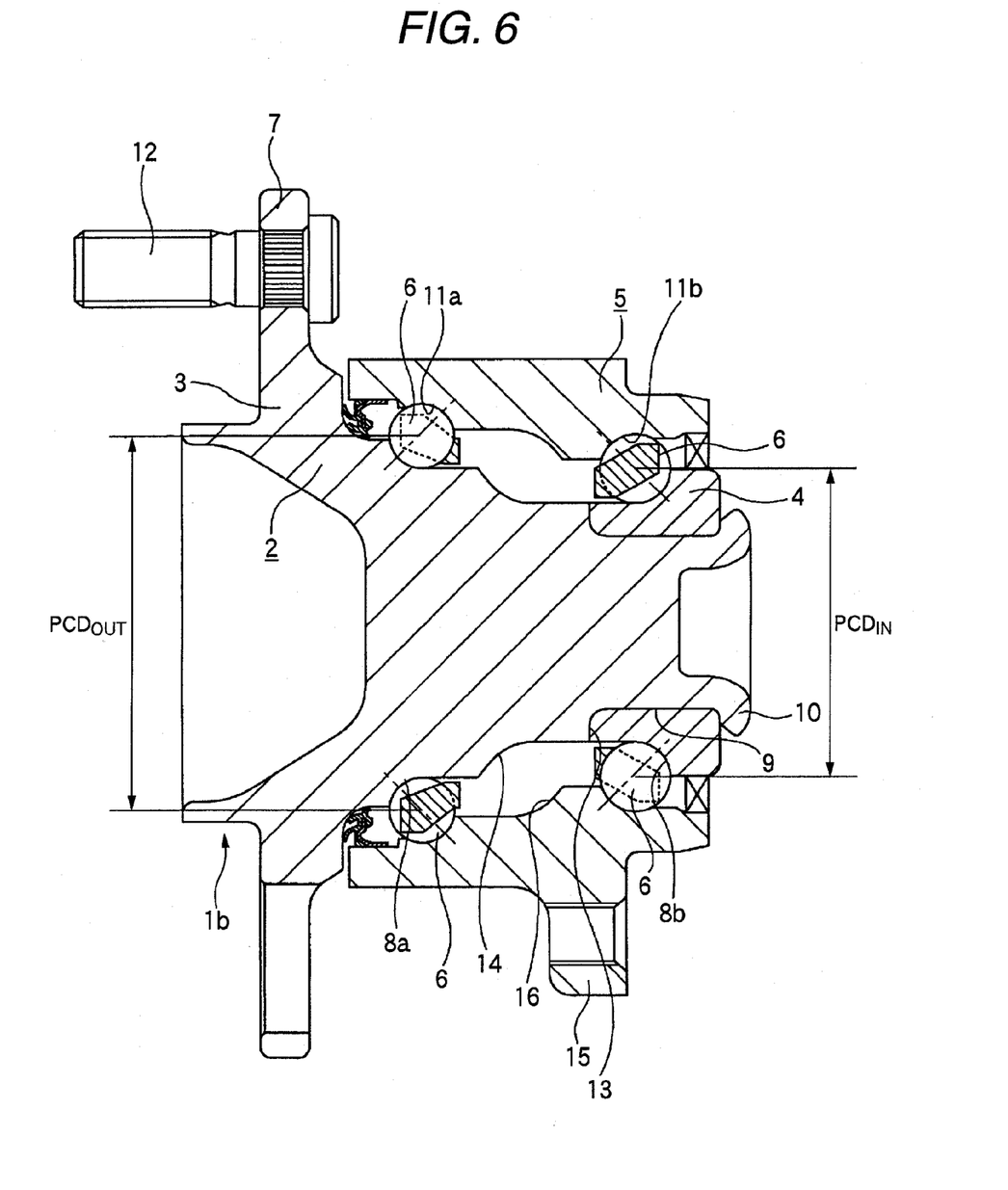
[FIG. 6] A sectional view showing a third example of the same and a wheel supporting rolling bearing unit which constitutes an object of a manufacturing method of the invention.

In addition, FIG. 6 shows a construction described in Patent Document No. 5. A wheel supporting rolling bearing unit 1b of a third example includes a hub 2, an outer ring 5, and a plurality of balls 6, 6 which are individually rolling elements. In these components, the hub 2 is formed by combining a hub main body 3 and an inner ring 4. The hub 2 has a mounting flange, which supports a wheel and a brake rotary member and is formed at an axially outer end side of an outer circumferential surface thereof and double rows of inner ring raceways 8a, 8b, which are formed at axially intermediate portion and an inner end portion thereof, respectively. In these two inner ring raceways 8a, 8b, the diameter of the inner ring raceway 8a as an axial outside row is made larger than the diameter of the inner ring raceway 8b as an axial inside row. Distal end portions of a plurality of studs 12 are fixed to the mounting flange 7, so that a brake rotary member such as a disc and a wheel which makes up a road wheel are allowed to be fixedly supported on the mounting flange 7.

In the construction shown in FIG. 6, to make different the diameters of the two inner ring raceways 8a, 8b, an outer circumferential surface side inclined stepped portion 14 is formed at an axially intermediate portion on the outer circumferential surface of the hub main body 3 in a position which lies slightly further axially inwards than the inner ring raceway 8a of the outside row. The outer circumferential surface side inclined stepped portion 14 is inclined so that an outside diameter thereof decreases as it extends axially inwards. A small-diameter stepped portion 9 is formed at an axial inner end portion of the hub main body 3 which lies further axially inwards than the outer circumferential surface side inclined stepped portion 14.

Then, the inner ring 4 having the inner ring raceway 8b of the axial inside row on an outer circumferential surface thereof is fitted on this small-diameter stepped portion 9, and this inner ring 4 is pressed against a rising surface 13 which lies at an axial outer end portion of the small-diameter stepped portion 9. In this state, the inner ring 4 is fixedly connected to the hub main body 3. Both the two inner ring raceways 8a, 8b have a circular arc-shaped cross section (a generatrix shape) and their outside diameters decrease as they approach each other (as they extend towards an axial center of the hub 2).

The outer ring 5 has double rows of outer ring raceways 11a, 11b on an inner circumferential surface thereof and a connecting flange 15 which fixedly connects the outer ring 5 to a suspension system and formed on an outer circumferential surface. In these two outer ring raceways 11a, 11b, the diameter of the axially outside outer ring raceway 11a is made larger than the diameter of the axially inside outer ring raceway 11b. For this purpose, in the construction in FIG. 6, an inner circumferential surface side inclined stepped portion 16 is formed at an axially intermediate portion on the outer circumferential surface of the outer ring 5 in a position which lies slightly further axially inwards than the outside outer ring raceway 11a. The inner circumferential surface side inclined stepped portion 16 is inclined so that an inside diameter thereof decreases as it extends axially inwards, The two outer ring raceways 11a, 11b have a circular arc-shaped cross section (a generatrix shape) and their outside diameters decrease as they approach each other (as they extend towards an axial center of the hub 2).

The respective balls 6, 6 are provided rollingly between the two inner ring raceways 8a, 8b and the two outer ring raceways 11a, 11b so that pluralities of balls 6, 6 are disposed therebetween, respectively. In this state, a preload and a contact angle of back-to-back type (DB type) are imparted to the balls 6, 6 which are disposed in the double rows. Pitch circle diameters of the balls 6, 6 in the two rows are made different according to a difference in diameter between the inner ring raceways 8a, 8b and the outer ring raceways 11a, 11b. Namely, the pitch circle diameter $PCD_{OUT}$ of the respective balls 6, 6 (outside row) in the axially outside row is made larger than the pitch circle diameter $PCD_{IN}$ of the respective balls 6, 6 (inside row) in the axially inside row ($PCD_{OUT} > PCT_{IN}$). In the illustrated example, although the balls 6, 6 are used as rolling elements, if a rolling bearing unit for a heavy motor vehicle, tapered rollers may be used as the rolling elements.

Heretofore, the constructions of the wheel supporting rolling bearing units described in Patent Documents Nos. 2 to 6 in which the pitch circle diameters of the rolling elements in the two rows are made different are explained. In these constructions, the moment rigidity is made large by such an extent that the pitch circle diameter $PCD_{OUT}$ of the outside row can be made large, and this facilitates the design to realize improvements in running stability when the vehicle turns and durability of the wheel supporting rolling bearing unit. On the other hand, since the pitch circle diameter $PCD_{IN}$ of the inside row does not have to be made large, part (knuckle mounting hole) of the suspension system dose not have to particularly be increased in diameter. Consequently, even though this part of the suspension system is not particularly made large in size, the improvement in both running stability and durability can be realized.

Figure 7:
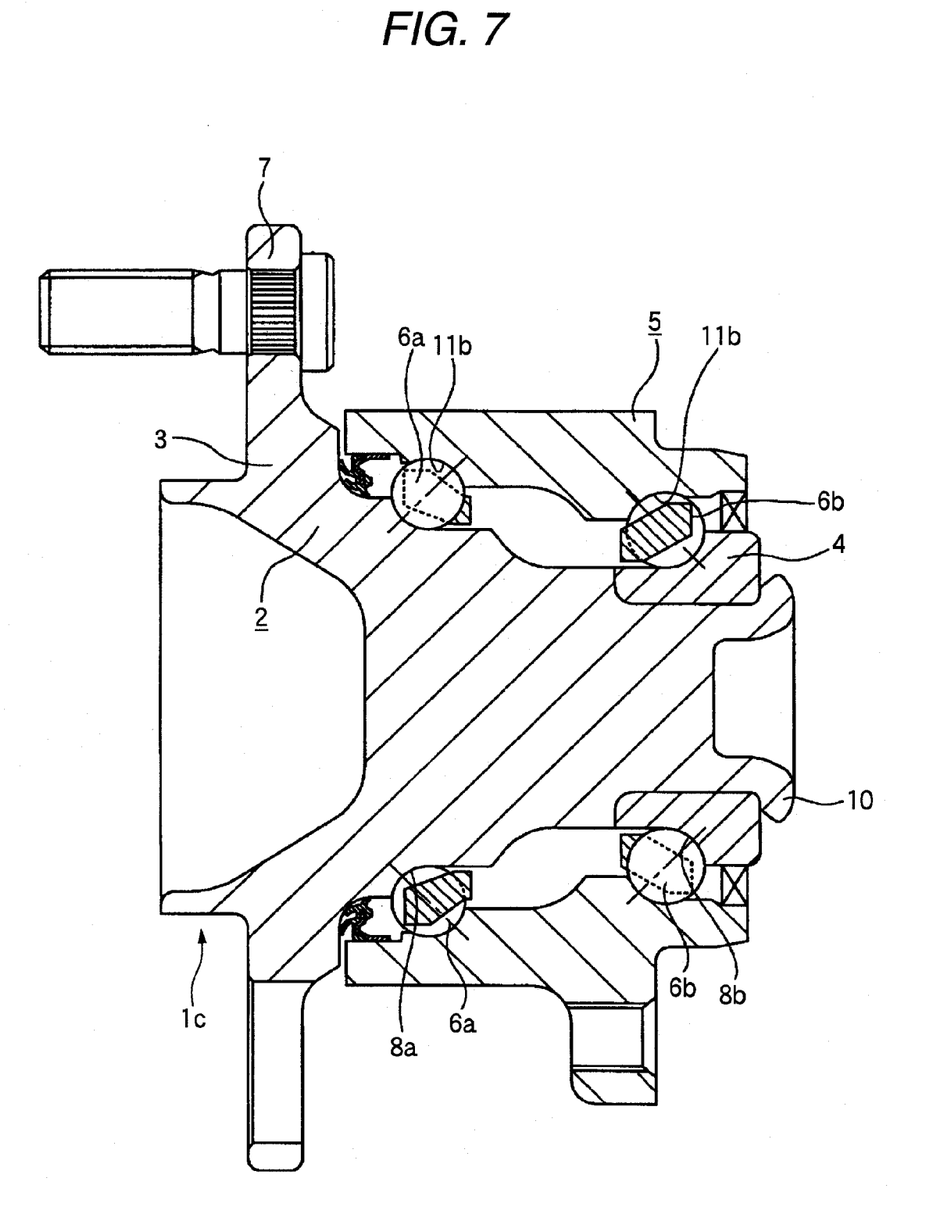
[FIG. 7] A sectional view showing a fourth example of the same and a wheel supporting rolling bearing unit which constitutes an object of the manufacturing method of the invention.

While in the construction shown in FIG. 6, the diameters of the rolling elements 6, 6 which are disposed in the double rows are made equal, as with a wheel supporting rolling bearing unit 1c shown in FIG. 7, there has conventionally been known a construction in which the diameter of rolling elements 6a, 6a in an outside row is made smaller than the diameter of rolling elements 6b, 6b in an inside row. In this construction, as a fourth example, shown in FIG. 7, the number of rolling elements 6a, 6a in the outside row is made sufficiently larger than the number of rolling elements 6b, 6b in the inside row, whereby the rigidity of the outside row is made much higher than the rigidity of the inside row. Although the balls are used as the rolling elements in the respective illustrated examples, tapered rollers may be used as rolling elements for a rolling bearing unit for use on a heavy motor vehicle.

While any of the constructions shown in FIGS. 4 to 7 is automatically assembled on a production line of a bearing factory, if a defect such as a flaw exists somewhere in the construction, noise and vibrations generated while driving the vehicle and also a sufficient durability cannot be ensured. Thus, in a bearing factory, all or part of assembled wheel supporting rolling bearing units are inspected (a total inspection or a sampling inspection) to determine on the existence of defects. If there should be a defect, then, the production line is repaired or modified to eliminate a cause which generates the defect.

In general, a flaw on a rolling contact portion is considered as a type of defect which triggers a repair or modification of the production line. Namely, if flaws exist on the rolling contact portions between the rolling surfaces of the respective rolling elements 6, 6a, 6b and the respective raceways 8a, 8b, 11a, 11b, immoderate vibrations are generated when operating the wheel supporting rolling bearing unit and also early flaking originated from the flaws is generated, and then leading to a possibility of remarkably shorten the durability of this wheel supporting rolling bearing unit. Flaws which constitute a cause for the drawback like this are singly generated by a contamination of foreign matters or caused by a trouble on the production line side such as a failure in controlling the production facility. If such a trouble occurs, unless the production line is repaired immediately, plural defective products are produced, thus deteriorating the yield of products.

Thus, it becomes necessary to determine the existence of flaws on the rolling contact portions through inspection. As an inspection method for determining the existence of flaws like this, as is described in Patent Document No. 7, it is general practice to measure vibrations of a rolling bearing unit and to measure whether or not vibrations of a large amplitude (remarkably large vibrations compared with vibrations generated during normal driving) are contained in a specific frequency in the vibrations so measured. The revolving speed of the respective rolling elements which make up the rolling bearing unit (the rotational speed of the cages) is expressed by $$n_c = (n_i/2) \cdot \{1 - \cos \alpha / (d_m/d)\}$$

when the inside diameter side raceway ring member rotates, and is expressed by $$n_c = (n_e/2) \cdot \{1 + \cos \alpha / (d_m/d)\}$$

when the outside diameter side raceway ring member rotates. In both the expressions, d denotes the diameter of the rolling elements, $d_m$ the pitch circle diameter of the rolling elements, α the contact angle [°] of the rolling elements, ni the rotational speed [s$^{-1}$] of the inside diameter side raceway ring member and $n_e$ the rotational speed [s$^{-1}$] of the outside diameter side raceway ring member.

For example, assuming that the number of rolling elements is Z, if a flaw exists in one location on an outer ring raceway in a circumferential direction thereof with an inside diameter side bearing ring rotating, vibrations in a frequency of $Z \cdot n_c$ [Hz] are generated, while if a flaw exists in one location on an inner ring raceway in a circumferential direction thereof with the inside diameter side bearing ring rotating, vibrations in a frequency of $Z \cdot (n_i - n_c)$ [Hz] are generated. Vibrations in specific frequencies are similarly obtained when an outside diameter side raceway ring member rotates. Further, if a flow exists on the rolling surface of the rolling element, a frequency of vibrations based on the flaw is obtained based on the rolling speed of the rolling element itself.

Thus, by rotating the inside diameter side raceway ring member (or the outside diameter side raceway ring member) of the assembled rolling bearing unit, measuring vibrations of this rolling bearing unit and determining whether vibrations in the frequencies described above exist in the measured vibrations, whether or not a flaw exists on the rolling contact portions of this rolling bearing unit can be determined.

The determination in the way is implemented without any specific problem if the rolling bearing unit is a single row rolling bearing unit. However, if a double row rolling bearing unit like the wheel supporting rolling bearing units shown in FIGS. 4 to 7, it is not possible to know on which rolling contact portion of the row the flaw exists without any modifications to the flaw inspecting configuration for single row rolling bearing units. Namely, in the conventional wheel supporting rolling bearing units shown in FIGS. 4 to 5 which are used generally, since the specifications (the diameter, number, pitch circle diameter and contact angle of the rolling elements) of the two rows are the same, whether a flaw exists in the outside row or in the inside row, vibrations in the same frequency are generated. Therefore, it is not possible to specify in which of the rows the flaw exists, and hence, the repair of the production line cannot be started immediately. Namely, until disassembling the wheel supporting rolling bearing unit on which the flaw is determined to exist through analysis of the frequencies of vibrations to observe the raceway surfaces and the rolling surfaces, the row on which the flaw exists can not be specified. However, disassembling the wheel supporting rolling bearing is troublesome. In particular, in the constructions shown in FIGS. 4, 6, 7 in which the hub main body 3 and the inner ring 4 are fixedly connected together by the clamping portion 10, the clamping portion 10 needs to be ground off, and hence, time taken from confirmation of existence of the flaw to identification of the position where the flaw exists becomes long. When this time is taken long, time during which the production line is stopped to prevent the manufacture of defective products becomes long, and production efficiency becomes lower.

Further, in the wheel supporting rolling bearing units 1*b*, 1*c* shown in FIGS. 6 and 7, respectively, the contact angle of the balls 6, 6, 6*a*, 6*b* needs to be controlled properly as well as imparting a proper preload to the respective balls 6, 6, 6*a*, 6*b* so that the performances with respect to low torque characteristic, rigidity, durability and the like are exhibited as desired. It is general practice that the contact angle of the respective balls 6, 6, 6*a*, 6*b* is controlled to be equal (e.g., on the order of 20 to 45 degrees) between the outside row and the inside row. The larger the preload becomes, although the higher the rigidity of the wheel supporting rolling bearing units 1*b*, 1*c*, however, the higher the dynamic torque and shorter the fatigue life of the rolling surface. On the other hand, the larger the contact angle becomes, although the higher the axial rigidity, however, lower the radial rigidity and larger the spin at the rolling contact portion to thereby reduce the fatigue life of the rolling contact surface.

As is obvious from these facts, it is important to set the preload and the contact angle properly. Even in the wheel supporting rolling bearing units described in Patent Documents Nos. 2 to 6 in which the pitch circle diameters of the rolling elements in the two rows are made different, it is important to control the preload imparted to the respective rolling elements and the contact angle properly from the viewpoint that the performances with respect to low torque characteristic, rigidity, durability and the like are exhibited as desired.

However, in the wheel supporting rolling bearing units in which the pitch circle diameters of the rolling elements in the two rows are made different, since the rigidities of the two rows are different, unless a consideration, which is different from that to be taken for the general wheel supporting rolling bearing units in which the pitch circle diameters of the rolling elements in the two rows are equal, is taken, it is not possible to control properly the contact angles and the preloads of the two rows. The reason for this will be described below.

It is already known from, for example, Non-Patent Document No. 1 that when an axial load is exerted on a radial rolling bearing, the contact angle of respective rolling elements becomes large. In the wheel supporting rolling bearing unit which is intended by the invention, by imparting axial load to the rolling elements which are disposed in the double rows, a predetermined preload is imparted to the respective rolling elements. For example, in the construction shown in FIG. 6, the preload is imparted to the respective balls 6, 6, 6*a*, 6*b* which are disposed between the pair of inner ring raceways 8*a*, 8*b* and the double rows of outer ring raceways 11*a*, 11*b* by pressing the inner ring 4 outwards in the axial direction by the clamping portion 10 so as to shorten the pitch between the two inner ring raceways 8*a*, 8*b*. The magnitude of the preload (the quantity of the preload) becomes the amount of displacement of the inner ring 4 towards the outside in the axial direction from a state that the rolling surfaces of the rolling elements which are the respective balls 6, 6, 6*a*, 6*b* are brought into light contact with the two inner ring raceways 8*a*, 8*b* and the two outer ring raceways 11*a*, 11*b* (without imparting any preload to the respective balls 6, 6, 6*a*, 6*b*)

From this fact that imparting the preload to the rolling elements in the two rows (the balls 6, 6, 6*a*, 6*b*) in the wheel supporting rolling bearing unit which is intended by the invention is similar to the state in which the axial load is exerted on the radial rolling bearing, whereby the contact angle of the rolling elements in the two rows becomes large. In the general conventional wheel supporting bearing unit, since the specifications (the pitch circle diameter, the rolling element diameter, the number of rolling elements) of the two rows are equal to each other, amounts of changes in contact angle of the rolling elements in the two rows which occur in association with impartation of the preload are the same. Therefore, it has been relatively easy to control the preload and contact angle of the rolling elements in the two rows to proper values when the wheel supporting rolling bearing unit is completely assembled.

In contrast to this, in the wheel supporting rolling bearing unit which is intended by the invention in which the pitch circle diameters of the rolling elements in the two rows are made different, since the rigidities of the two rows are different, to control the preload to be imparted to the rolling elements (the balls 6, 6, 6*a*, 6*b*) in the two rows and contact angle properly, a special consideration is necessary. Namely, in the construction in which the pitch circle diameter of the axially outside row is larger than the pitch circle diameter of the axially inside row, the axial rigidity of the axially outside row becomes larger than the axial rigidity of the axially inside row. On the other hand, a force axially pushing the rolling elements in the two rows for imparting preload becomes equal, of course. Thus, when the inner ring 4 is pushed axially outwards to impart the preload, elastic deformation of the respective portions (the respective raceways and the rolling surfaces of the rolling elements) which is linked with impartation of the preload to the respective rolling elements becomes more on the outside row than on the inside row. As a result, degree at which the contact angle is increased in association with impartation of the preload becomes larger on the outside row than on the inside row.

Thus, in the wheel supporting rolling bearing unit which is intended by the invention in which the pitch circle diameters of the rolling elements in the two rows are made different, if the contact angles (initial contact angles) of the rolling elements in the two rows are made identical in a state that no preload has been imparted yet, as done on the conventional wheel supporting rolling bearing, the contact angles of the two rows become different after completion of assembling of the bearing unit (after the impartation of the preload). Furthermore, in association with generation of the difference in contact angle between these two rows, the preload imparted to the rolling elements in the two rows becomes different from the desired value (because the axial load that is generated in association with the axial displacement of the inner ring due to the impartation of the preloads is not generated as desired).

As a result, the preload and the contact angle of the rolling elements in the two rows become improper.

In the construction shown in FIG. 6, while the construction is illustrated in which the inner ring 4 fitted on the axial inner end portion of the hub main body 3 is pressed by the clamping portion 10, the aforesaid problem is generated irrespective of the construction in which the inner ring is pressed or not. For example, although a construction is also known in which an axial inner end face of an inner ring is pressed by a nut which is thread fitted on an externally threaded portion provided on an axial inner end portion of a hub main body, the same problem is also generated in the construction like this. In addition, also in a construction in which an inner ring is pressed by a housing of a constant velocity joint, the problem is caused in a similar manner. Furthermore, even in the event that rolling elements are tapered elements, the same problem is generated.

Patent Document No. 1: JP-A-2004-142722
Patent Document No. 2: JP-A-2003-232343
Patent Document No. 3: JP-A-2004-108449
Patent Document No. 4: JP-A-2004-345439
Patent Document No. 5: JP-A-2006-137365
Patent Document No. 6: International Publication WO 2005/065077 pamphlet
Patent Document No. 7: JP-A-2004-361390
Non-Patent Document No. 1: pages 62 to 65 of "Rolling Bearing, Dynamic Load Capacity of Rolling bearing," written and published by Junzo Okamoto, and printed by Seibunsha Ltd. Printing, in September, 1987

DISCLOSURE OF THE INVENTION

Problem that the Invention is to Solve

The invention has been made in view of the situations that have been described above, and a first object thereof is to provide a method for manufacturing a wheel supporting rolling bearing unit in which a pitch circle diameter of rolling elements in an outside row and a pitch circle diameter of rolling elements in an inside row are made different, wherein both a preload and a contact angle of the two rows can be made proper. A second object is to provide a double row rolling bearing unit inspecting method, wherein the existence of a defect in an assembled double row rolling bearing unit is determined, and in the event that a defect exists, a location of the defect is specified quickly to modify a production line quickly so as to increase production efficiency.

Means for Solving the Problem

With a view to attaining the first object, a wheel supporting rolling bearing unit which is intended by a manufacturing method of a first aspect of the invention includes, as with the conventional constructions shown in FIGS. 6 and 7, an outer ring, a hub and a plurality of rolling elements.

In these components, the outer ring has double rows of outer ring raceways on an inner circumferential surface thereof.

The hub has a mounting flange which fixedly supports a wheel at an axial outer end portion on an outer circumferential surface and double rows of inner ring raceways at axial intermediate and inner end portions on the same surface and is formed by combining a hub main body and an inner ring. The hub main body has the inner ring raceway constituting an outside row and a small diameter stepped portion which are provided at an axial intermediate portion and an axial inner end portion thereof, respectively. The inner ring has the inner ring raceway constituting an inside row which is provided on an outer circumferential surface thereof and is fixedly connected to the hub main body in such a state that the inner ring is fitted on the small diameter stepped portion and is pressed axially outwards.

The respective rolling elements are provided between these two inner ring raceways and the two outer ring raceways so that pluralities of rolling elements are disposed in the respective rows in back-to-back configuration with a predetermined contact angle and preload is imparted to each of the two rows.

A pitch circle diameter of the axial outside row is larger than a pitch circle diameter of the axial inside row.

In the manufacturing method of the invention for manufacturing the wheel supporting rolling bearing unit, initial contact angles are made different from each other between the outside row and the inside row. Note that the initial contact angles mean initial contact angles of the respective rolling elements which result in such a state that the rolling surfaces of the rolling elements of the two rows are brought into contact with the two inner ring raceways and the two outer ring raceways without any preload imparted to the respective rolling elements (the respective portions are brought into light contact with each other without being elastically deformed).

With respect to these initial contact angles, the initial contact angles of the rolling elements in the two rows are made smaller than the predetermined contact angles, respectively. In addition, the extent to which the initial contact angle of the rolling elements in the inside row is made smaller than the predetermined contact angle is made larger than the extent to which the initial contact angle of the rolling elements in the outside row is made smaller than the predetermined contact angle. Then, the contact angles of the rolling elements in the two rows are made to be the predetermined contact angles, respectively in a state that the inner ring is pressed to axially outside.

When carrying out the wheel supporting rolling bearing unit manufacturing method of the invention that has been described above, for example, the predetermined contact angles related to the rolling elements in the two rows may be made equal to each other. For this purpose, the initial contact angle of the rolling elements in the outside row is set larger than the initial contact angle of the rolling elements in the inside row.

Alternatively, when carrying out the invention, preferably, for example, the number of rolling elements in the outside row is made larger than the number of rolling elements in the inside row. In this case, more preferably, the diameter of the rolling elements in the outside row is made smaller than the diameter of the rolling elements in the inside row.

In addition, with a view to attaining the second object, a double row rolling bearing unit inspecting method of a second aspect of the invention inspects the existence of a defect with respect to a double row rolling bearing unit including an outside diameter side raceway ring member having double rows of outer ring raceways on an inner circumferential surface thereof, an inside diameter side raceway ring member having double rows of inner ring raceways on an outer circumferential surface thereof and rolling elements provided between the two outer ring raceways and the two inner ring raceways so that pluralities of rolling elements are rollingly disposed in the two rows, respectively, wherein specifications of the two rows are made different from each other.

In the double row rolling bearing unit inspecting method of the invention, firstly, vibrations of the double row rolling bearing unit are measured while rotating relatively the outside diameter side raceway ring member and the inside diameter side raceway ring member. Then, the existence of the defect is inspected based on frequencies of the vibrations of the two rows, and in the inspection step, based on the frequency of vibrations generated by the defect, the row where the defect exists is specified from the two rows.

Note that the defect to be specified through the inspection may be a defect in rolling contact portions between rolling surfaces of the respective rolling elements and the two outer ring raceways and the two inner ring raceways. That is, a flaw existing in rolling contact portions between two rows of raceways (any portion of the inner ring raceways, the outer ring raceways and the rolling surfaces). Further, the defect may be at least either of a defect in the number of rolling elements which are to be built in each row and a defect due to the specification of the rolling elements to be built in each row.

Furthermore, as a mode for differentiating the specifications, any mode may be considered, provided that it can change the frequency of vibrations. For example, by differentiating one or two or more of the diameter, number, pitch circle diameter, and contact angle of the rolling elements between the two rows, the frequency of vibrations generated by the defect can be differentiated clearly (to such an extent that no overlapping of frequencies occur due to dimension error, configuration error and the like).

Advantage of the Invention

According to the wheel supporting rolling bearing unit manufacturing method according to the first aspect of the invention which is configured as has been described above, with respect to the wheel supporting rolling bearing units in which the pitch circle diameters of the rolling elements in the outside row and the inside row are made different, both the preload and the contact angle of the rolling elements in the two rows can made proper. Namely, since the initial contact angles of the rolling elements in the two rows are made different according to the difference in axial load between the two rows which are based on the difference in pitch circle diameter, the contact angles of the rolling elements in the two rows can be made to be predetermined values (proper values), respectively. In addition, since the contact angles of the rolling elements in the two rows in the completed state (in the state in which the preload has been imparted) can be made equal to each other, the amount of displacement of the inner ring due to the impartation of the preload is translated into a desired axial load, the proper preloads can be imparted to the rolling elements in the two rows, respectively. As a result, the completed wheel supporting rolling bearing unit can be made to exhibit the performances with respect to low torque characteristic, rigidity, durability and the like as desired. If the rolling elements are balls, the present invention can prevent from causing of the contact angle excessively large, which may cause the rolling surfaces of the balls to ride on edges of the raceway surfaces so that edge load is exerted on the rolling contact portion. Thus, the present invention avoids early exfoliation or flaking on the rolling surfaces of the balls.

According to the double row rolling bearing unit inspecting method according to the second aspect of the invention, time taken from confirmation of existence of the flaw to identification of the position where the flaw exists can be shortened. Namely, the existence of the flaw on the rolling contact portion is known from the generation of vibrations of a large amplitude in vibrations generated in association with operation of the double row rolling bearing unit, and the location (any portion of the inner ring raceways, the outer ring raceways and the rolling surfaces of either of the rows) where the flaw exists can be identified based on the frequency of the vibrations of the large amplitude. Thus, the position where the flaw exists can be identified, so as to implement repair work on the production line without disassembling the double row rolling bearing unit. As a result, the time during which the production line is stopped to prevent the manufacture of defective products can be shortened, thereby reduction in production costs can be reduced through increased production efficiency.

BRIEF DESCRIPTION OF THE DRAWINGS

[FIG. 2] Enlarged views of a portion indicated by X in FIG. 1 showing, respectively, FIG. 2A shows a state before impartation of a preload and FIG. 2B shows a state after impartation of the preload at (B).

DESCRIPTION OF REFERENCE NUMERALS 1, 1a, 1b, 1c, 1d wheel supporting rolling bearing unit; 2, 2a hub; 3 hub main body; 4, 4a inner ring; 5 outer ring; 6, 6a, 6b rolling element; 7, 7a mounting flange; 8a, 8b inner ring raceway; 9 small diameter stepped portion; 10 clamping portion; 11a, 11b outer ring raceway; 12 stud; 13 rising surface; 14 outer circumferential surface side inclined stepped portion; 15 connecting flange; 16 inner circumferential surface side inclined stepped portion; 17 cylindrical portion; 22 motor; 23 determination apparatus; 24 vibration pickup; 25a, 25b, 25c, 25d indicator

BEST MODE FOR CARRYING OUT THE INVENTION

First Embodiment

Figure 1:
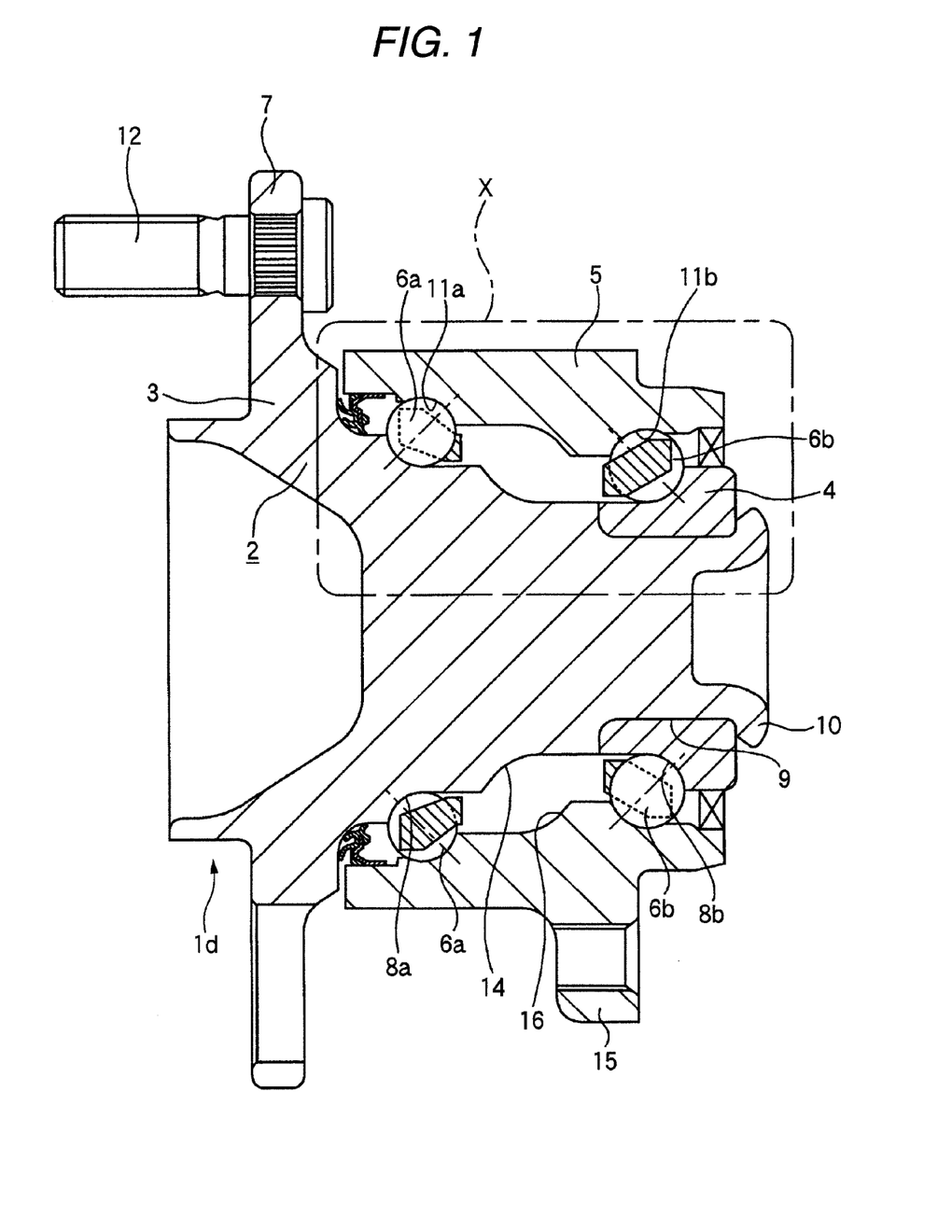
[FIG. 1] A sectional view showing a first embodiment of the invention.
Figure 2A:
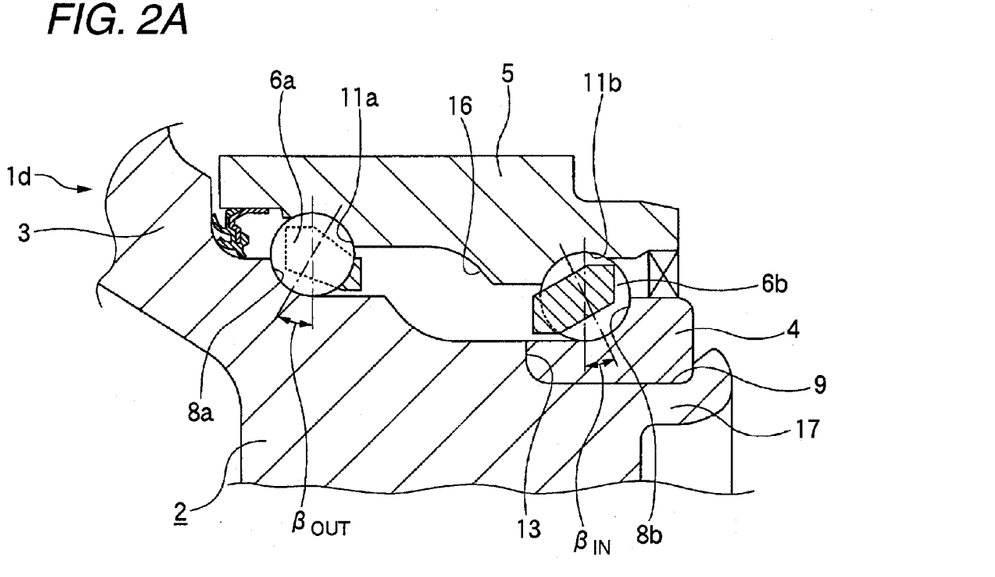
Figure 2B:
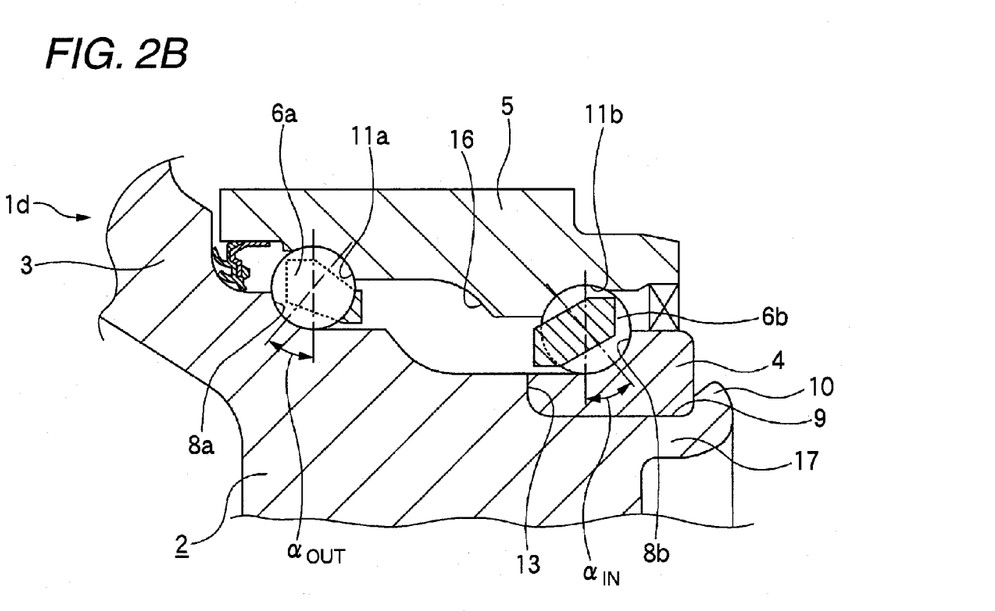

FIGS. 1 to 2 show a method for manufacturing a wheel supporting rolling bearing unit 1d according to a first embodiment of the invention. Note that this embodiment is characterized in that even when the axial rigidity of a rolling bearing portion constituting an outside row which is made up of a plurality of balls 6a, 6a which individually constitute rolling elements and the axial rigidity of a rolling bearing portion constituting an inside row which is made up of a plurality of balls 6b, 6b which also constitute rolling elements individually are different, proper preloads and contact angles are imparted to the balls 6a, 6b in the two rows.

In the example shown in the figure, the diameter (e.g., about 10.3 mm) of the balls 6a, 6a in the outside row is made smaller than the diameter (e.g., about 11.1 mm) of the balls 6b, 6b in the inside row, so that the number (e.g., about 15 balls) of balls 6a, 6a in the outside row is made larger than the number (e.g., about 11 balls) of balls 6b, 6b in the inside row. In conjunction with this, the radius of curvature of cross sections (generatrix shapes) of an inner ring raceway 8a and an outer ring raceway 11a which make up the outside row is made smaller than the radius of curvature of cross sections of an inner ring raceway 8b and an outer ring raceway 11b which make up the inside row. In addition, the pitch circle diameter of the balls 6a, 6a in the outside row is made to be 60 mm, for example, and the pitch circle diameter of the balls 6b, 6b in the inside row is made to be, for example, 50 mm.

By these configurations, in this embodiment, the axial rigidity of the rolling bearing portion constituting the outside row which are made up of the respective balls 6a, 6a is made much larger than the axial rigidity of the rolling bearing portion constituting the inside row which is made up of the respective balls 6b, 6b. Thus, while this construction is effective from the viewpoint of enhancing the running performance of a motor vehicle, the construction has difficulty in imparting proper preloads and contact angles to the balls 6a, 6b in the two rows. Since the configuration and function of the other portions are the same as those of the conventional construction illustrated in FIG. 6, the description of those similar portions will be omitted or simplified, and hereinafter, characteristic parts of the invention and the embodiment will mainly be described.

In the wheel supporting rolling bearing unit 1d that is configured as has been described above, contact angles $\alpha_{OUT}$, $\alpha_{IN}$ (in FIG. 2B) of the balls 6a, 6b in the two rows in a completed state (a state in which predetermined preloads have been imparted) are made equal to each outer ($\alpha_{OUT}=\alpha_{IN}$). The contact angles $\alpha_{OUT}$, $\alpha_{IN}$ in the completed state are determined in design to be in the range of, for example, on the order of 20 to 45 degrees in consideration of the performances regarding low torque characteristic, rigidity, durability and the like which are required for the wheel supporting rolling bearing unit.

In particular, in the manufacturing method of the invention, as is shown at in FIG. 2A, initial contact angles $\beta_{OUT}$, $\beta_{IN}$ are made different from each other between the outside row and the inside row. In addition, as has been described before, these initial contact angles $\beta_{OUT}$, $\beta_{IN}$ mean the contact angles of the respective balls 6a, 6b which results when the rolling surfaces of the balls 6a, 6b in the two rows are brought into light contact with both the inner ring raceways 8a, 8b and both the outer ring raceways 11a, 11b without imparting any preload to the respective balls 6a, 6b (without any elastic deformation of the respective portions). In the manufacturing method of the invention, the initial contact angles $\beta_{OUT}$, $\beta_{IN}$ are made smaller than the predetermined contact angles $\alpha_{OUT}$, $\alpha_{IN}$, respectively ($\beta_{OUT}<\alpha_{OUT}$, $\beta_{IN}<\alpha_{IN}$).

In addition, the extent to which the initial contact angles $\beta_{IN}$ of the balls 6b, 6b in the inside row is made smaller than the predetermined angle $\alpha_{IN}$ of the balls 6b, 6b, that is, the difference ($\alpha_{IN}-\beta_{IN}$) between both the contact angles $\beta_{IN}$, $\alpha_{IN}$ is made larger than the extent to which the initial contact angles $\beta_{OUT}$ of the balls 6a, 6a in the outside row is made smaller than the predetermined angle $\alpha_{OUT}$ of the balls 6a, 6a, that is, the difference ($\alpha_{OUT}-\beta_{OUT}$) between both the contact angles $\beta_{OUT}$, $\alpha_{OUT}$ {($\alpha_{IN}-\beta_{IN}$)>($\alpha_{OUT}-\beta_{OUT}$)} (If $\alpha_{IN}=\alpha_{OUT}$ according to this embodiment, $\beta_{IN}<\beta_{OUT}$).

When assembling the wheel supporting rolling bearing unit 1d, as is shown at in FIG. 2A, from a state that an inner ring 4 is fitted on a small diameter stepped portion 9 provided at an axial inner end portion of a hub main body 3 and an axial outer end face of the inner ring 4 is brought into contact with a rising face 13 existing at an axial outer end portion of the small diameter stepped portion 9, a portion, which projects further than an axial inner end face of the inner ring 4, of a distal end portion of a cylindrical portion 17 formed at an axial inner end portion of the hub main body 3 is plastically deformed (compressed to be expanded) radially outwards, whereby the portion is made into a clamping portion 10 as is shown in FIG. 2B.

The inner ring 4 is displaced axially outwards in the step of forming the clamping portion 10. Then, a state that the clamping portion 10 is completed, the inner ring 4 is pressed against the rising surface 13 existing at the axial outer end portion of the small diameter stepped portion 9. In this step, the distance between the inner ring raceway 8b constituting the inside row which is formed on an outer circumferential surface of the inner ring 4 and the inner ring raceway 8a constituting the outside row which is formed on an outer circumferential surface of the hub main body 3 in an intermediate portion thereof is shortened. Thus, preloads which match the amount of displacement of the inner ring 4 to the outside in the axial direction are imparted to the balls 6a, 6b in the two rows. At this occurs, the contact angles of the balls 6a, 6b in the two rows are increased. Namely, the initial contact angles $\beta_{IN}$, $\beta_{OUT}$ of the balls 6a, 6b in the two rows are changed to the predetermined contact angles $\alpha_{OUT}$, $\alpha_{IN}$, respectively.

Consequently, when the initial contact angles $\beta_{IN}$, $\beta_{OUT}$ of the balls 6a, 6b and the preloads (which is proportional to the amount of displacement of the inner ring 4 to the outside in the axial direction) imparted to the balls 6a, 6b in the two rows in association with the work on the clamping portion 10, the contact angle of the balls 6a, 6b in the two rows can be controlled to the predetermined contact angles $\alpha_{OUT}$, $\alpha_{IN}$ in the completed wheel supporting rolling bearing unit. The amount of change in contact angle based on the preloads imparted to the balls 6a, 6b in the two rows is obtained by the following expression (1), as is described in Non-Patent Document No. 1 described above.

[Expression 1]

$$\cos\alpha = \frac{\cos\beta}{1 + \frac{cD_a}{r_i + r_e - D_a}\left(\frac{Q}{D_a^2}\right)^{\frac{2}{3}}} \quad (1)$$

$\alpha$ in this expression (1) corresponds to the predetermined contact angles $\alpha_{OUT}$, $\alpha_{IN}$, and $\beta$ in the same expression corresponds to the initial contact angles $\beta_{OUT}$, $\beta_{IN}$. In addition, Q denotes rolling element load (axial preload), $D_a$ the diameter of the balls, $r_i$ the radius of curvature of the cross section of the inner ring raceway, and $r_e$ the radius of curvature of the cross section of the outer ring raceway. Additionally, c denotes a constant of contact deformation which is determined by a ratio $\{f_m=(r_i+r_e)/(2\cdot D_a)\}$ of the mean value $f_m$ of the radius of curvature of the inner ring raceway and the radius of curvature of the outer ring raceway to the diameter of the balls, and they are shown in Table 1 below.

TABLE 1

| fm | c |
|---|---|
| 0.51 | 0.00176 |
| 0.5125 | 0.00186 |
| 0.515 | 0.00194 |
| 0.5175 | 0.00201 |
| 0.52 | 0.00208 |
| 0.525 | 0.00218 |
| 0.53 | 0.00227 |

TABLE 1-continued

| fm | c |
|---|---|
| 0.54 | 0.00242 |
| 0.55 | 0.00254 |
| 0.56 | 0.00263 |
| 0.57 | 0.00271 |
| 0.58 | 0.00278 |
| 0.59 | 0.00284 |
| 0.60 | 0.00289 |
| 0.61 | 0.00294 |
| 0.62 | 0.00299 |
| 0.63 | 0.00303 |

From the expression (1) and Table 1, when the initial contact angles $\beta_{OUT}$, $\beta_{IN}$ are set to achieve the predetermined contact angles $\alpha_{OUT}$, $\alpha_{IN}$ as targets, the contact angles of the balls 6a, 6b in the two rows can be made to be the predetermined contact angles $\alpha_{OUT}$, $\alpha_{IN}$, respectively in such a state that the inner ring 4 is directed to the outside in the axial direction by the clamping portion 10 so as to be pressed against the rising surface 13.

As has been described above, according to the manufacturing method of the embodiment, with respect to the wheel supporting rolling bearing unit in which the pitch circle diameters of the balls 6a, 6b in the outside row and the inside row, as well as the diameters and the numbers of the respective balls 6a, 6b are made different, both the preloads and contact angles of the balls 6a, 6b in the two rows can be made proper. As a result, the completed wheel supporting rolling bearing unit 1d can exhibit the performances with respect to low torque characteristic, rigidity, durability and the like as desired.

Second Embodiment

Next, a double row rolling bearing unit inspecting method according to a second embodiment of the invention will be described. FIG. 3 shows steps of the inspecting method of the invention in which whether or not a flaw exists in the rolling contact portions of the wheel supporting rolling bearing unit 1b is determined, and if it is determined that the flaw exists, then in which portion of the rolling contact portions the flaw exists is determined. When performing an inspecting operation, the hub 2 is driven to rotate by a motor 22 with a rotational speed detector and the rotational speed of the hub 2 is inputted into a determination apparatus 23. In addition, a measuring element of a vibration pickup 24 is brought into abutment with the outer ring 5 to measure vibrations of the wheel supporting rolling bearing unit 1, and a measurement signal of the vibration pickup 24 is inputted into the determination apparatus 23. This determination apparatus 23 includes a filter circuit and an operation circuit to thereby obtain a frequency of vibrations of the wheel supporting rolling bearing unit 1 based on the measurement signal of the vibration pickup 24. Then, when the amplitude of vibrations of a specific frequency is large, the determination apparatus 23 identifies a location where a flaw exists which generates the vibrations of the frequency in association with the rotational speed of the hub 2 and indicates the location so identified in any of indicators 25a to 25d. In this embodiment, whether or not a flaw exists in any (including two locations or more) of the inner ring raceways 8a, 8b and the outer ring raceways 11a, 11b which constitute the inside row and the outside row is made to be indicated in the indicators 25a to 25d which are provided four in total. In addition, as has been described above, since, even when the flaw exists on the rolling surface of the rolling element, the frequency of vibrations based on the flaw can be obtained based on the rolling speed of the rolling element, the flaw on the rolling surface can be detected by adding an indicator for the rolling elements.

To enable the identification of a location where a flaw exists on either of the inner ring raceways 8a, 8b and the outer ring raceways 11a, 11b and also the identification of a location where the flaw exists on either of the outside row and the inside row, the specifications of the two rows are made different from each other in the wheel supporting rolling bearing unit 1b. As a mode for differentiating the specifications, any mode may be adopted, which can provide a difference in the frequency of vibrations, and one or two or more of the diameters, numbers, pitch circle diameters and contact angles of the rolling elements 6, 6 between the two rows. In this case, when other factors than the number of rolling elements 6, 6, are made different, the factors should be made different from each other so clearly that frequencies of vibrations based on a flaw do not overlap each other between the two rows, irrespective of dimension error and configuration error. Namely, also in any of the wheel supporting rolling bearing units shown in FIGS. 1 and 4 to 7, the inspection object may be such as to differentiate the aforesaid specifications.

For example, a case is considered in which the diameter d of the respective rolling elements 6, 6 is 11.112±0.010 mm, the pitch circle diameter of the respective rolling elements 6, 6 is 50±0.1 mm, the number Z of rolling elements 6, 6 is 13, the contact angles $\alpha_{OUT}$, $\alpha_{IN}$ of the respective rolling elements 6, 6 are 35±2°, and the hub 2 is rotated at $1s^{-1}$. In this case, the rolling element passing frequency on the outer ring raceways 11a, 11b side (the frequency of vibrations generated in association with revolution of the rolling elements 6, 6 when a flaw exists on the outer ring raceways 11a, 11b) becomes 5.28 to 5.35$s^{-1}$ (Hz). In contrast to this, the rolling element passing frequency on the inner ring raceways 8a, 8b side (the frequency of vibrations generated in association with revolution of the rolling elements 6, 6 when a flaw exists on the inner ring raceways 8a, 8b) becomes 7.65 to 7.72 $s^{-1}$ (Hz)

In a case like this, since the frequency of vibrations generated when the flaw exists on the outer ring raceways 11a, 11b and the frequency of vibrations generated when the flaw exists on the inner ring raceways 8a, 8b are clearly different, it becomes possible to identify whether the flaw exists on the outer ring raceways 11a, 11b or the inner ring raceways 8a, 8b. However, in this state, it is not possible to identify whether the flaw exists on the outside row or the inside row. Then, in the case as has been described above, for example, the contact angle $\alpha_{OUT}$ of the rolling elements 6, 6 in the outside row is changed to 40±2°. The contact angle $\alpha_{IN}$ of the rolling elements 6, 6 in the inside row is made to remain at 35±2°. When the contact angle $\alpha_{OUT}$ of the rolling elements 6, 6 in the outside row is changed to 40±2° in this way, under the conditions described above, the rolling element passing frequency on the side of the outer ring raceway 11a in the outside row becomes 5.36 to 5.43 $s^{-1}$ (Hz), while the rolling element passing frequency on the side of the inner ring raceway 8a in the outside row becomes 7.57 to 7.64 $s^{-1}$ (Hz) under the same conditions. As a result of this, it becomes possible to identify whether the flaw exists on the outer ring raceways 11a, 11b or the inner ring raceways 8a, 8b and also on the outside row or the inside row.

Since only the contact angles $\alpha_{OUT}$, $\alpha_{IN}$ are differentiated in the example described above, no large difference in rolling element passing frequency cannot be set between the two rows. However, if two or more of the diameters, numbers, pitch circle diameters and contact angles of the rolling elements 6, 6 are differentiated between the two rows, a large difference in rolling element passing frequency can be set between the two rows. Then, an increase in reliability associated with the identification of the position where the flaw is generated can be realized. In addition, the location with which the measuring device of the vibration pickup 24 is brought into abutment carrying out in the invention is not limited to the axial end face of the outer ring 5. The measuring device may be brought into abutment with the outer circumferential surface of the outer ring 5, or when the outer ring is made to rotate, the measuring device can be brought into abutment with an axial inner end face or an outer circumferential surface of the inner ring. In addition, the frequency of vibrations detected by the vibration pickup 24 is not limited to the basic frequency which is based on the revolving frequency $n_c$ which is obtained by the aforesaid expression, and hence, vibrations of a high frequency which is n times higher than the basic frequency may be made to be detected. In short, frequencies should be selected appropriately from the viewpoint of ensuring the inspection reliability and enhancing the efficiency of the inspection.

While in the second embodiment, whether or not the flaw exists on the rolling contact portions of the wheel supporting rolling bearing unit is determined, and if the flaw is determined to exist, then in which portion of the rolling contact portions the flaw exists is determined, the inspecting method of the invention is not limited to inspection of a defect such as a flaw, and hence, a defect to be inspected may be a defect in the numbers of rolling elements which are built in the respective rows or a defect resulting from the specifications of the rolling elements which are built in the respective rows. Namely, for example, by measuring vibrations (frequency or level), the presence of defects such as a shortage in number of rolling element to be built in the respective rows can be detected and if they are present, in which of the rows the defects are present can be determined. Further, when balls are used as rolling elements which are built in the respective rows and diameters of balls so used are made different between the two rows, balls of erroneous diameters are mixed in the respective rows, such a defect be determined and be identified in which of the rows the defects are present can be determined.

INDUSTRIAL APPLICABILITY

The invention is not limited to the embodiments but can be modified and improved as required. In addition, the inspecting method of the second embodiment can be applied to a completed wheel supporting rolling bearing unit in the wheel supporting rolling bearing unit manufacturing method of the first embodiment. The invention can be carried out in the construction in which the inner ring fitted on the inner end portion of the hub main body is pressed by the clamping portion and also in the construction in which the inner ring is pressed by the nut. In addition, the invention can also be carried out in a construction in which tapered rollers are used in one or both of the two rows. Furthermore, the contact angles of the rolling elements in the two rows in the completed state do not necessarily have to be made equal. Namely, the contact angles may be made different so as to make the rigidities of the two rows optimum according to the pitch circle diameters of the rolling elements and diameters of the rolling elements in the two rows.

Note that this patent application is based on Japanese patent applications No. 2006-248879 filed on Sep. 14, 2006 and No. 2006-271010 filed on Oct. 2, 2006, and all the contents thereof are incorporated herein by reference.

The invention claimed is:

1. A method for manufacturing a wheel supporting rolling bearing unit, the wheel supporting rolling bearing unit comprising:
   an outer ring comprising an inner circumferential surface having an outboard outer ring raceway and an inboard outer ring raceway,
   a hub comprising a hub main body and an inner ring,
   the hub main body comprising an axially outer end portion, an axially intermediate portion and an axially inner end portion, the axially outer end portion comprising a mounting flange configured to fixedly support a wheel, the axially intermediate portion comprising an outer circumferential surface having an outboard inner ring raceway, and the axially inner end portion comprising a small diameter stepped portion,
   the inner ring comprising an outer circumferential surface having an inboard inner ring raceway, wherein the inner ring is fitted on e small diameter stepped portion such that the inner ring is pressed in an axially outer direction and is fixedly connected to the hub main body;
   an outboard row of rolling elements provided between the outboard outer ring raceway and the outboard inner ring raceway; and
   an inboard row of rolling elements provided between the inboard outer ring raceway and the inboard inner ring raceway, wherein the outboard row of rolling elements and the inboard row of rolling elements are disposed in back-to-back configuration with a preload imparted thereto such that the outboard row of rolling elements has a preloaded outboard contact angle and the inboard row of rolling elements has a preloaded inboard contact angle, wherein
   a pitch circle diameter of the outboard row of rolling elements is larger than a pitch circle diameter of the inboard row of rolling elements,
   the method comprising:
      bringing rolling surfaces of the outboard row of rolling elements into contact with the outboard outer ring raceway and the outboard inner ring raceway and rolling surfaces of the inboard row of rolling elements into contact with the inboard outer ring raceway and the inboard inner ring raceway without imparting any preload to the outboard row of rolling elements and the inboard row of rolling elements such that the outboard row of rolling elements has an initial outboard contact angle and the inboard row of rolling elements has an initial inboard contact angle, wherein the initial outboard contact angle is smaller the preloaded outboard contact angle, the initial inboard contact angle is smaller than the preloaded inboard contact angle, and an extent to which the initial inboard contact angle is smaller than the preloaded inboard contact angle is larger than an extent to which the initial outboard contact angle of the rolling elements is smaller than the preloaded outboard contact angle; and
      fixedly connecting the inner ring to the hub main body in a state that the inner ring is pressed in the axially outer direction such that the outboard row of rolling elements has the preloaded outboard contact angle and the inboard row of rolling elements has the preloaded inboard contact angle.

2. The wheel supporting rolling bearing unit as set forth in claim 1, wherein the initial outboard contact angle is larger than the initial inboard contact angle to make the preloaded outboard contact angle and the preloaded inboard contact angle equal to each other.

3. The wheel supporting rolling bearing unit as set forth in claim 1 or 2, wherein
the number of rolling elements in the outboard row of rolling elements is larger than the number of rolling elements in the inboard row of rolling elements.

4. The wheel supporting rolling bearing unit as set forth in claim 3, wherein
the diameter of each of the rolling elements in the outboard row of rolling elements is smaller than the diameter of each of the rolling elements in the inbord row of rolling elements.

* * * * *